July 2, 1963 J. C. BUXTON 3,095,944
MUFFLER
Filed Oct. 27, 1960 2 Sheets-Sheet 1
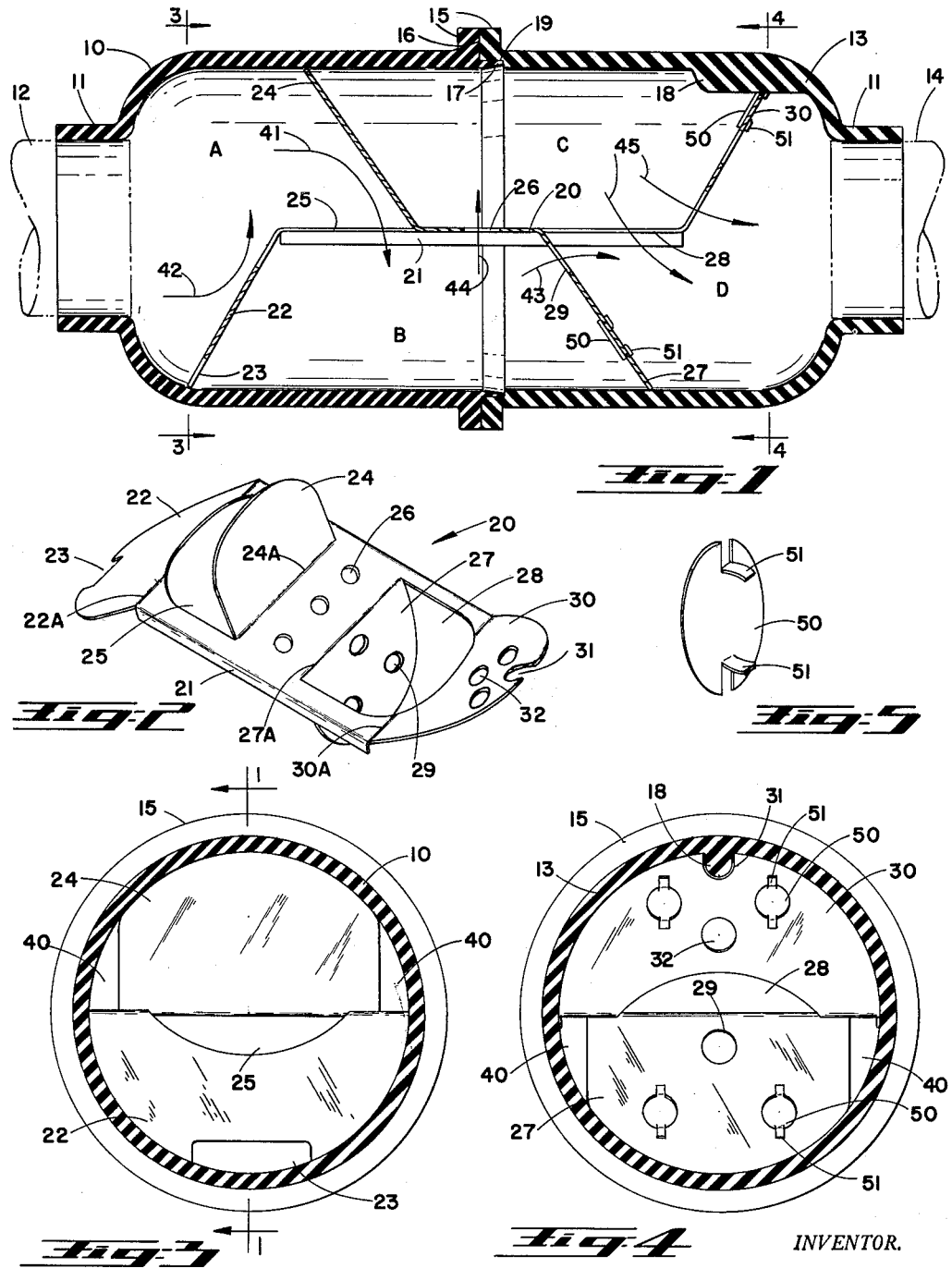
INVENTOR.
JARVIS C. BUXTON
BY
Ru R. Schermerhorn
ATTORNEY July 2, 1963  J. C. BUXTON  3,095,944
MUFFLER Filed Oct. 27, 1960  2 Sheets-Sheet 2

INVENTOR.
JARVIS C. BUXTON
BY
Lee R. Schermerhorn
ATTORNEY

United States Patent Office 3,095,944
Patented July 2, 1963

3,095,944
MUFFLER
Jarvis C. Buxton, Portland, Oreg., assignor to Griffith Rubber Mills, Portland, Oreg., a corporation of Oregon
Filed Oct. 27, 1960, Ser. No. 65,346
11 Claims. (Cl. 181—70)

This invention relates to improvements in mufflers and silencers, particularly for marine internal combustion engines.

Corrosion has always presented a serious problem in all engine mufflers and, particularly, in marine engine mufflers which ordinarily carry the cooling water from the engine. In order to provide reasonable durability in marine mufflers, it has been the general practice in the past to make them of a heavy cast iron construction as distinguished from the sheet metal type of construction ordinarily used in automobile mufflers.

More recently, following the introduction of heat resistant synthetic rubber such as neoprene, rubber mufflers have been developed for marine use and have proved quite successful in resisting deterioration and in muffling or silencing the various noises emanating from an internal combustion engine without requiring the considerable weight and shipping cost of the conventional cast iron muffler. Since rubber is inherently a sound deadening and sound absorbing material, a rubber muffler is very effective in silencing the exhaust noises to a remarkable degree without introducing objectionable back pressure in the exhaust manifold of the engine.

The rubber mufflers thus far developed, however, have required a plurality of rather expensive molds for internal and external separate rubber parts and the types of construction which have been adopted have entailed considerable expense in fabrication and assembly. The mold cost is multiplied several times by the necessity for making mufflers of different sizes for different sizes of engines. Thus, the overall advantage over cast iron has not been as great as might be expected and there exists a need for a lower cost rubber muffler.

There is also a more serious objection to the types of rubber mufflers heretofore developed. The interior slitted or ported baffles or diaphragms, being of rubber like the casing, are subject to damage under certain conditions of operation. When the engine is warming up after a cold start, the cooling system thermostat shuts off the cooling water discharge into the exhaust pipe. During this interval when there is no water passing through the muffler, the hot exhaust gases often burn the edges of the slits or ports. Also, rubber baffles and diaphragms are often burned by backfires when explosions occur in the exhaust pipe and muffler.

The general object of the present invention, is therefore, to provide an improved rubber muffler of less complicated and expensive construction.

Other objects are to provide a muffler of the type described which does not require as many different molds for making separate parts, to provide a muffler which has fewer parts to be assembled, to provide a muffler having a rubber casing containing a single unattached metal baffle member, to provide a muffler which can be made in a single size for a wide range of engine sizes, to provide a muffler particularly adapted for rear mounted engines in boats, and to provide a muffler which will take the place of an elbow in the exhaust pipe at the transom of a boat.

In the preferred embodiments herein illustrated, the present muffler consists of only three parts. These parts comprise a pair of rubber end shells and a metal baffle plate. Preferably, no fixed attachments are employed between the baffle plate and the shell members whereby the parts are assembled by merely inserting the baffle plate into the shell members and then fastening the shell members together by adhesive or vulcanization. The baffle member is stamped from a single metal plate to provide a series of outstanding deflectors which form a plurality of chambers in the casing formed by the rubber end shells. Some of the deflectors may have openings closed by plugs which may be removed to reduce the back pressure on a large engine. The gas pulsations from the engine explosions have their energy dissipated by impingement against the resilient rubber casing and in passing circuitously in different parallel paths from chamber to chamber within the muffler so that the resulting exhaust issues from the muffler at a tolerable noise level. A side outlet in one of the end shells adapts the muffler to serve as an elbow in the exhaust pipe when desired.

Other objects and advantages will become apparent and the invention will be better understood with reference to the following description of the preferred embodiment illustrated on the drawings. Various changes may be made, however, in the details of construction and arrangement of parts and all such modifications within the scope of the appended claims are included in the invention.

In the drawings:

FIGURE 1 is a vertical longitudinal sectional view through a cylindrical muffler embodying the principles of the invention, taken on the line 1—1 in FIGURE 3;

FIGURE 2 is a perspective view on a reduced scale of the baffle plate shown in FIGURE 1;

FIGURE 3 is a cross sectional view taken on the line 3—3 of FIGURE 1;

FIGURE 4 is a cross sectional view taken on the line 4—4 of FIGURE 1;

FIGURE 5 is an enlarged perspective view of one of the baffle port plugs shown in FIGURE 1;

Figure 6:
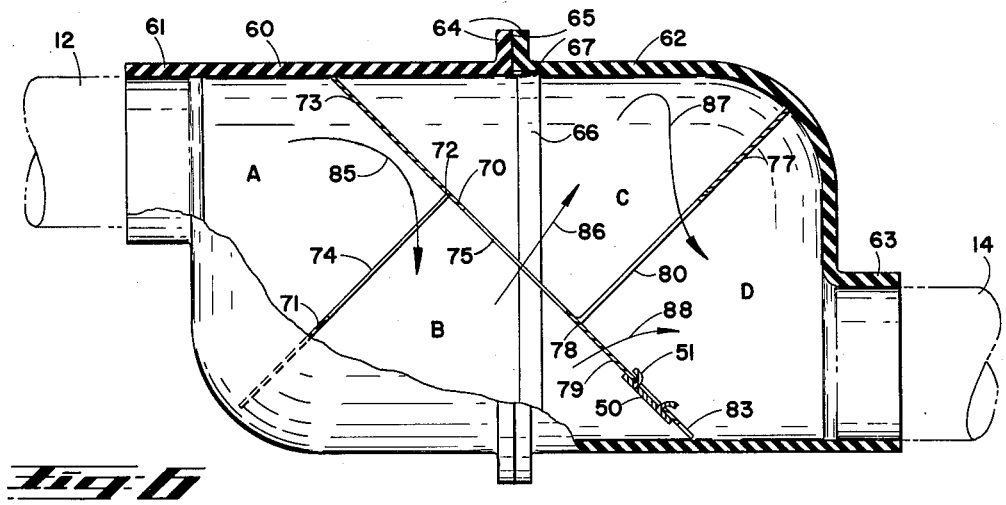
FIGURE 6 is a view partly in side elevation and partly in longitudinal section, showing a modified form of construction having a rectangular casing.
Figure 7:
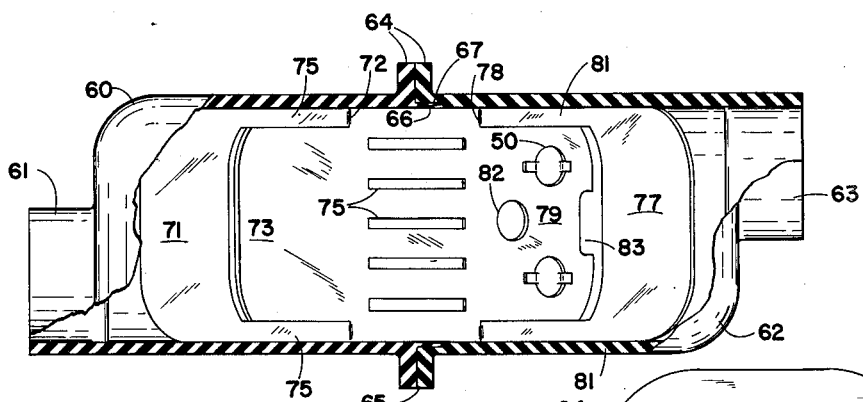
FIGURE 7 is a top plan view of the muffler in FIGURE 6 with a major portion of the top of the outer casing broken away to show the baffle plate.

In FIGURE 1, the bell-shaped cylindrical end shell 10 of a suitable resilient rubber such as neoprene has a reduced cylindrical inlet end extension 11 adapted for connection with the engine exhaust pipe 12. A similar rubber shell member 13 is adapted to be connected with a tailpipe 14 which ordinarily projects through the transom of the boat. The exhaust pipe 12 and tailpipe 14 are ordinarily made of metal and the two rubber shell members are mounted thereon by applying ring-type hose clamps or the like around the necked extensions 11. The two shell members are equipped at their large ends with outstanding cylindrical flanges 15 which are vulcanized together in a peripheral joint 16. Preferably, the inlet shell 10 is molded with an integral annular lip 17 which projects a short distance into the shell member 13 to overlie the joint 16 so that internal gas pressure will not tend to blow out through the joint. Lip 17 is contained in an annular recess 19 in shell 13. Shell 13 is formed with an internal lug 18, the purpose of which will presently appear.

Within the casing thus formed by the two rubber shells 10 and 13, there is contained an unattached baffle plate 20 made of any suitable material which will withstand the temperature and corrosive agents present in a muffler. Baffle plate 20 is preferably rigid or substantially rigid to the extent that it will retain its shape under the conditions existing in the muffler. Monel metal is well suited for a marine muffler but any other material which satisfies the foregoing conditions may be used. For example, if the muffler is to be used on an air compressor or pneumatic tool, a much wider selection of suitable materials would be available.

In the present instance, baffle plate 20 is made from a flat plate having portions punched out and bent to assume the shape shown in FIGURE 2. Marginal side edge portions of the plate are downturned to form flanges 21. One end is bent down on a fold line 22a to form a deflector tongue 22 extending forwardly at an oblique angle of about 45°. The extremity of deflector tongue 22 is notched at 23 to admit the engine cooling water freely into the lower portion of the rubber casing. Rearwardly from the tongue 22 a second imperforate tongue 24 is struck out and bent up on the fold line 24a at a forwardly directed oblique angle of about 45°, leaving a large opening 25 therebeneath in the residual circumjacent material.

The middle portion of the plate immediately behind tongue 24 is provided with a plurality of openings 26. Rearwardly of the openings 26 a tongue 27 similar to the tongue 24 is struck out and bent downward on the fold line 27a at a rearwardly projecting oblique angle of about 45°, leaving a large opening 28. This tongue is provided with a plurality of port openings 29. The rear end of the plate is bent upward on a fold line 30a at an oblique angle of about 45° to form the rearwardly extending tongue 30. The extremity of this tongue is notched at 31 to fit the lug 18 and the body of the tongue is provided with port openings 32.

In assembling the muffler, one end of the baffle 20 is inserted into one of the rubber shells and then the other rubber shell is drawn over the other end of the baffle until the flanges 15 come together. The baffle cannot move lengthwise in the shells because the ends of deflectors 22 and 30 fit against the rounded end corners of the shells and the baffle plate cannot rotate relative to the shells because of the locking engagement of lug 18 in notch 31. The baffle plate cannot move laterally from side to side because the flanges 21 engage the inside surfaces of the shells at their opposite sides and the baffle plate cannot rock or otherwise move vertically because the end of tongue 24 engages the upper side of shell member 10 and the end of tongue 27 engages the lower side of shell member 13. Any looseness of the baffle plate within the shells is prevented by initially bending the tongues 24 and 27 to a somewhat steeper angle so that these tongues will bear resiliently against the inside walls of the shells after assembly. The downturned side flanges 21 provide smooth bearing surfaces to slide against the inside surfaces of the shells during assembly without cutting the rubber. Thus, after assembly and vulcanization of the joint 16, the baffle plate is held securely in a fixed position without employing any fastening means.

The end tongues 22 and 30 are preferably of an elliptical curvature to fit the cylindrical side surfaces of the shells. The two intermediate tongues 24 and 27 have elliptical end portions to fit the curvature of the shell walls but are somewhat narrower than the inside diameter of the shells whereby small open spaces 40 exist on the opposite sides of these tongues as shown in FIGURES 3 and 4.

The single integral baffle plate 20 forms four chambers A, B, C and D within the muffler. The stream of exhaust gas entering the chamber A is divided initially into two principal flow paths as indicated by the arrows 41 and 42. The gases in flow path 41 are deflected by the imperforate tongue 24 downwardly through opening 25 against the lower side of the rubber shell 10 while the gases following the path 42 are directed upwardly by the deflector 22 transversely across the path 41 and against the upper side of rubber shell 10. Thus, even in the entering chamber A, the entering stream of gas is broken into different flow paths which cross each other to break up the solid front of each advancing shock wave. Moreover, each flow path is directed immediately against a resilient rubber wall where a considerable part of its energy is dissipated by the inherent sound deadening and energy absorbing properties of rubber.

All the gas following path 42 must also enter chamber B through the opening 25 but, in so doing, these pulsations proceed through a longer course of travel over a more circuitous path putting them out of phase with the pulsations following path 41. Leaving chamber B, the gas stream divides, part of it proceeding through openings 29 and 40 directly into chamber D and part of it flowing laterally through openings 26 into chamber C and impinging again broadside against the inner walls of the rubber shells. A minor gas flow also passes directly from chamber A to chamber C through openings or spaces 40. The combined gas flows from chambers A and B leave chamber C through openings 28 and 32 into chamber D in out-of-phase relationship with the gas following flow path 43 by reason of the longer and more circuitous path of the gas passing through chamber C. Then the gas stream having been repeatedly divided and re-united in out-of-phase relationship, passes out of chamber D into the tailpipe 14 with the sound level of the engine explosions much reduced in loudness as well as being modified in tone so that the exhaust noise emitted into the atmosphere is not objectionable from the standpoint of noise level or the harshness of the sound.

Another factor also enters into the effectiveness of the present muffler in subduing the exhaust noise of the engine. In the usual marine installation, a steady stream of cooling water enters the muffler along with the exhaust gases. This cooling water flows down through notch 23 into chamber B and thence through openings 29 into chamber D where it is retained to the approximate level of the lower side of the tailpipe 14. The whole entering gas stream comprising both portions 41 and 42 enter chamber B in a downward direction to impinge substantially broadside on top of the body of water in the bottom of the casing, causing great turbulence in both the water and gas which absorbs additional energy in the explosion wave fronts. This action is repeated again to some extent by the portion of the gas flowing downward through opening 28 against the body of water in chamber D. These several effects all contribute and augment each other in reducing the noise level and modifying the character of the sound emitted from the tailpipe. It will be appreciated, further that the rubber body of the muffler does not act as a sounding board to transmit and amplify the explosion noise as well as the vibration noise from the engine as does a muffler having a metal outer shell.

In order to take maximum advantage of the hydraulic effects as above described, the muffler of FIGURE 1 is preferably mounted in a horizontal position with the baffle plate oriented to horizontal position within the casing as shown in the drawing. The usual disposition of the exhaust pipe from a midship engine in a boat readily admits of the fulfillment of these conditions since some portion of the exhaust pipe normally extends horizontally at some point between the engine and the transom. The horizontal alignment of the pipes 12 and 14 will thereby support the muffler in a position to retain the desired body of water therewithin. All that remains is to insure the horizontal disposition of the baffle plate 20 within the rubber casing. This is readily accomplished by providing a suitable indicium such as the word "top" on the outside surface of the shell 13 over the lug 18. Since the necks 11 and pipes 12 and 14 are cylindrical, the casing is merely rotated on the pipes to bring the lug 18 around to the top side before the hose clamps are tightened. Also, to prevent reversal of the casing end for end, the shell 10 carries on its outside surface the designation "inlet" while the shell 13 carries the designation "outlet."

Further, to standardize the muffler for the purpose of minimizing the number of different parts to be manufactured and the variety of mufflers to be stocked by the dealers, it is possible to make the present muffler in a single size for use with a wide range of engines. This is accomplished by providing removable plugs for some of the openings 29 and 32. Figure 5 shows a circular disc 50, preferably of the same material as baffle plate 20, having a pair of fingers 51 struck out from its opposite sides. When the muffler is assembled, some of the openings 29 and 32 are plugged with the discs 50 as shown in FIGURES 1 and 4. This is done by applying the disc 50 to the upstream side of the baffle tongue and inserting fingers 51 through the opening 29 or 32. Then the fingers 51 are bent down flat against the downstream side of the baffle tongue as shown.

When the dealer sells a muffler for a small engine, he leaves the plugs in place. When he sells a muffler for use with a large engine, he may readily remove some or all of the plugs from each baffle tongue 27 and 30 according to the size of the engine. This is done by merely inserting a pair of long nose pliers or other suitable tool through the opening in the outlet neck 11 to straighten out the fingers 51 to their original positions shown in FIGURE 5. Then the plugs are pushed out of their holes and by tilting and rotating the casing, the plugs will drop out. The plugs from baffle tongue 30 may be caused to pass through opening 28 and out of the outlet neck 11. The plugs from baffle tongue 27 are pushed into chamber B and then passed through opening 25 into chamber A for removal through the inlet neck 11.

During warm-up or in case of a backfire, the metal baffle plate is not damaged. The rubber casing is not affected in either event. In previous rubber mufflers having rubber baffles or diaphragms, faulty engine operation from mistiming and other causes has resulted in backfiring often completely rupturing the diaphragms and making them inoperative without damaging the casing. Such rupture as well as burning or hardening deterioration of the baffle cannot occur in the present form of construction whereby the muffler has a long life under all conditions that may be encountered.

*Modification in FIGURES 6 to 10*

FIGURES 6 to 9 show a modification in which the casing comprises a molded rubber shell 60 having a cylindrical inlet extension 61 adapted for connection with the engine exhaust pipe 12 and a similar molded rubber shell 62 equipped with a cylindrical outlet extension 63 adapted for connection with the tailpipe 14. The two shells are united by vulcanizing together their end flanges 64 in the girth joint 65. This joint is additionally sealed by a rubber lip 66 on the shell 60 which is disposed within an annular recess 67 in the shell 62 to overlie the joint 65. The casing is rectangular in cross section to fit in a narrow space.

Within the casing is a baffle plate 70 made of suitable material, for exhaust gas or air as the case may be, as described in connection with the baffle plate 20 of the first embodiment. This plate has an inlet end deflector tongue 71 bent downward from the plate at approximately a right angle on the fold line 72 leaving a portion of the plate unbent to form the upwardly extending deflector tongue 73. This leaves a large opening 74 in the residual circumjacent material originally occupied by the tongue 73. The original plate 70 has the same width as the internal width of the casing whereby tongue 73 is of slightly less width leaving an open space 75 on each side thereof. There are preferably no other openings in the tongue portions 71 and 73.

The central portion of plate 70 is provided with a series of rectangular openings 75. The outlet end of the plate is bent upward at approximately right angles to form a deflector tongue 77 on the fold line 78. A portion of the tongue 77 is cut out and left unbent to form deflector tongue 79 leaving a large opening 80. Tongue 77 as well as the central portion of plate 70 have the same width as the inside of the casing and tongue 79 is slightly narrower leaving open spaces 81 between opposite sides of the tongue and the inside wall of the casing.

Tongue 79 is provided with port openings 82, some of which are closed by removable plugs 50. Thus, the tongues of the baffle plate 70 divide the interior of the casing into four chambers A, B, C, D, generally similar to the corresponding chambers in FIGURE 1. Tongue 79 is notched at 83 to drain engine cooling water from chamber B.

In assembling the muffler of FIGURE 6, one end of the baffle plate 70 is inserted into the shell 60 and the other end is inserted into the shell 62 with the tongues 71 and 77 projecting into the end corners of the shells and the tongues 73 and 79 engaging the top and bottom walls of the respective shells. All that remains to be done is to cement or vulcanize the flanges 64 together, the baffle plate being held in position within the shells without any lugs or means of attachment.

When the muffler is sold for a small engine, the plugs 50 are left in certain of the openings 82 as provided by the manufacturer. When the muffler is to be used on a large engine, the dealer or customer inserts a pair of long nosed pliers through outlet neck 63 to straighten out the fingers 51 of one or more of the plugs, allowing the plug to be pushed out of its hole to fall into the chamber B. Then by upending the muffler, the removed plug or plugs may be caused to fall through opening 74 and out of inlet neck 61.

When the muffler is in use, the main flow of exhaust gases impinges first against deflector tongue 73 and is turned downward through opening 74 against the bottom wall of shell 60 in chamber B as indicated by arrow 85. The gases then pass upward through openings 75 and impinge against the top wall of rubber shell 62 in chamber C as indicated by arrow 86. This portion of the gas flow again reverses direction and escapes through opening 80 into chamber D as indicated by arrow 87. Another portion of the gas flow leaves chamber B through openings 78 and spaces 81 as indicated by the arrow 88 in out-of-phase relation with the pulsations following the longer path of arrow 87. Another portion of the inlet flow enters chamber C directly from chamber A through the open spaces 75 in out-of-phase relation with the pulsations entering from chamber B along the path of arrow 86.

Thus, as described in connection with FIGURE 1 a considerable portion of the sound energy of the explosion noises from the engine is absorbed or deadened by direct impingement against the resilient rubber walls of the casing while additionally the noise level is reduced and the tone modified or modulated by the repeated division and confluence of the different flow paths which bring the streams of sound impulses or wave fronts together in out-of-phase relationship. Added to this, of course, is the usual baffle effect of breaking up each entering wave front into a plurality of smaller streams of impulses and the muffling effect of the water bath in the bottom of the casing.

The embodiment in FIGURES 6 to 9 is of particular advantage in installations where it is desired to have the engine cooling water drain out of the muffler. This muffler may be installed in horizontal position as shown in FIGURE 6 or in an inclined position with the outlet extension 63 lowermost, whereby the water will drain out of the muffler through tailpipe 14 when the engine is shut off. When the engine is running, there is a continuous flow of water through the muffler, creating pools of water in motion in chambers A and B and a layer of water in motion in chamber D, all of which are splashed about violently in the process of absorbing energy from the wave fronts of the engine explosions passing through the muffler. The splashing of the water prevents overheating of the upper portions of the rubber casing.

This embodiment of the muffler is also of particular advantage in connection with inboard engines mounted in the stern of a boat close to the transom where an outboard motor type of propulsion is employed having a vertically disposed drive shaft outside of the transom. In such cases, the tailpipe 14 may be merely a short tube passing through the transom with the muffler outlet extension 63 mounted close to the transom on the inside.

Figures 8, 9, 10:
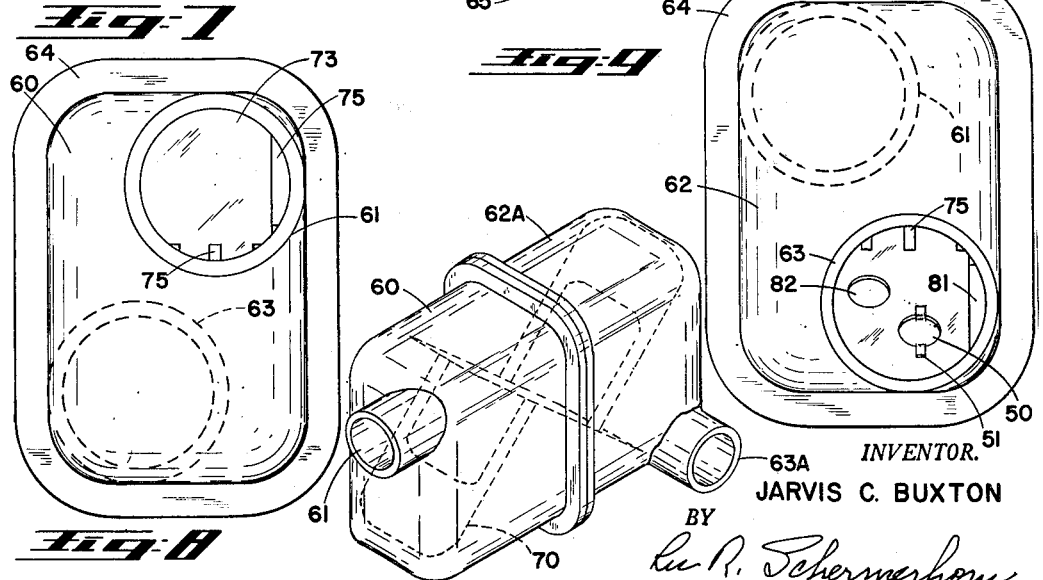
FIGURE 8 is an elevation view of the inlet end of the muffler in FIGURE 6.
FIGURE 9 is an elevation view of the outlet end of the muffler in FIGURE 6.
FIGURE 10 is a perspective view on a reduced scale of a modification of the type of muffler in FIGURE 6 having a side outlet end shell.

FIGURE 10 shows a slight modification of the muffler in FIGURES 6 to 9 which is particularly advantageous with certain stern-mounted engines. This muffler employs the shell 60 and baffle plate 70 of FIGURES 6 to 9, and the shell 62a is the same as shell 62 except that the outlet extension 63a is located in the side rather than the end of the shell, in communication with chamber D. When the engine is mounted close to the transom it is often necessary to make a right angle bend in the exhaust pipe and, in such cases, this muffler provides an elbow without requiring any special fittings. Outlet connection 63a is mounted close to the inside wall of the transom on a stub tailpipe extending through the transom at one side of center. The muffler casing may be disposed horizontally or with its inlet end inclined upward at any angle for connection with an engine exhaust pipe extending transversely across the transom to the engine, the engine exhaust manifold in such an arrangement usually being higher than the tailpipe connection at 63a. Obviously, the outlet connection 63a may be provided on either side of the shell 62a. By adapting the present muffler for mounting adjacent to the transom directly on a stub tailpipe through the transom, the muffler is necessarily mounted as far as possible from the engine, which is desirable in a rubber muffler in order to reduce its operating temperature.

Thus, three different mufflers are available by using either the rear outlet shell 62 or a right or left outlet shell 62a with the inlet shell 60 and baffle plate 70. In each case, the plugs 50 are accessible through the outlet opening for removal to adapt the muffler to different sizes of engines.

Having now described my invention and in what manner the same may be used, what I claim as new and desire to protect by Letters Patent is:

1. A muffler comprising a pair of resilient rubber shells connected together to form a casing having side and end walls, a baffle plate confined in said casing, outstanding deflectors on said plate braced against opposite side walls, and angular end portions on said baffle plate braced against opposite end walls to prevent transverse or endwise movements of said baffle plate in said casing.

2. A muffler as defined in claim 1, said casing being cylindrical and including a lug in one of said shells engaging one of said angular end portions to prevent rotation of said baffle plate in said casing.

3. A muffler comprising a pair of resilient rubber end shells secured together by a girth joint, one of said shells having an internal annular recess at said joint and the other shell having an annular sealing lip overlying said joint and disposed in said recess, and a rigid baffle plate contained in said shells and having outstanding deflectors, portions of said baffle plate engaging side and end portions of said shells to brace the baffle plate against longitudinal or transverse movement in said shells.

4. A muffler comprising a resilient rubber casing and a baffle plate confined in said casing, said baffle plate having a perforated mid portion and a pair of tongues struck out in opposite longitudinal directions and on opposite sides of circumjacent portions of said plate intermediate said mid portion and the opposite ends of the plate, portions of said baffle plate engaging side and end portions of said casing to brace the baffle plate against longitudinal or transverse movement in said casing.

5. A muffler comprising a resilient rubber casing having inlet and outlet openings therein, a baffle plate in said casing having openings therein, and detachable plugs in certain of said baffle plate openings, said plugs being accessible and removable through said casing openings.

6. A muffler comprising a resilient rubber casing having inlet and outlet openings therein, a baffle plate in said casing having openings accessible through one of said casing openings, and detachable plugs in said baffle plate openings, said baffle plate having other openings large enough to pass detached plugs therethrough for removal from one of said casing openings.

7. A muffler comprising a resilient rubber casing having internal side walls and end abutments, and a baffle plate confined in said casing, said baffle plate having deflectors extending obliquely in opposite directions longitudinally and transversely of the casing bracing the baffle plate from said walls and abutments in a fixed position in said casing.

8. A muffler comprising a resilient rubber casing, a baffle plate in said casing having angularly related deflectors at its opposite ends forming a plurality of chambers in said casing, one of said deflectors at each end of said baffle plate being a tongue cut from a residual portion of said plate leaving an opening in said residual portion, said residual end portions being bent at angles to said tongues and intermediate residual portions of said plate, one tongue and one residual plate end portion engaging one side and end portion, respectively, of said casing and another tongue and residual plate end portion engaging the opposite side and end portion, respectively, of said casing to position the baffle plate laterally and longitudinally in the casing.

9. A muffler comprising a rubber casing having side and end walls, and a baffle plate stabilized in said casing by deflector tongues on the baffle plate engaging the side walls and angular end portions of the plate engaging the corners between said side and end walls at oblique angles in opposite ends of the casing.

10. A muffler comprising a resilient rubber casing having inlet and outlet openings at opposite ends thereof, a baffle plate in said casing having a pair of angularly related deflectors at each of its opposite ends forming a plurality of chambers in said casing, one of said deflectors at each end of said baffle plate being a tongue cut from a residual portion of said plate leaving an opening in said residual portion, said residual end portions being disposed in angular relation to said tongues and intermediate residual portions of said plate, one tongue and one residual plate portion at one end of the baffle plate engaging opposite sides of said casing adjacent its inlet end and the other tongue and residual plate portion at the opposite end of the baffle plate engaging opposite sides of said casing adjacent its outlet end to hold said baffle plate in fixed position in said casing.

11. A muffler comprising a resilient rubber casing, a baffle plate in said casing, a pair of oppositely directed longitudinal tongues struck out from said plate leaving openings in circumjacent portions of the plate, said circumjacent portions extending beyond the ends of said tongues and forming deflectors on the ends of said plate, said deflectors being bent to project from opposite sides of said plate, said deflectors engaging opposite sides of said casing against opposite ends thereof to prevent lengthwise movement of said baffle plate in said casing, and said tongues engaging opposite sides of said casing intermediate said ends and acting conjointly with said deflectors to prevent transverse movement of said baffle plate in said casing without attachment to the casing.

(References on following page)

References Cited in the file of this patent

UNITED STATES PATENTS

| | | |
|---|---|---|
| 1,182,098 | Mayer | May 9, 1916 |
| 1,496,509 | Abell et al. | June 3, 1924 |
| 1,577,775 | Templeton | Mar. 23, 1926 |
| 1,688,488 | Dormeyer | Oct. 23, 1928 |
| 2,444,268 | Peters | June 29, 1948 |
| 2,933,148 | Hendry | Apr. 19, 1960 |

FOREIGN PATENTS

| | | |
|---|---|---|
| 290,737 | Great Britain | May 21, 1928 |
| 564,536 | Italy | June 19, 1957 |
| 789,507 | Great Britain | Jan. 22, 1958 |